July 3, 1956  M. JANKURA  2,752,787
PRESSURE GAUGE
Filed May 1, 1953

Inventor
Michael Jankura
by Roberts, Cushman & Grover
Att'ys.

United States Patent Office 2,752,787
Patented July 3, 1956

2,752,787

PRESSURE GAUGE

Michael Jankura, Stratford, Conn., assignor to Manning, Maxwell & Moore, Incorporated, New York, N. Y., a corporation of New Jersey Application May 1, 1953, Serial No. 352,461

3 Claims. (Cl. 73—416)

This invention relates to pressure gauges of the type wherein the indicator is actuated by a Bourdon tube and more especially to a specially constructed case for Bourdon gauges designed to avoid the hazard of blow-out in such instruments.

The conventional Bourdon pressure gauge consists of a case, containing a dial, pointer and Bourdon tube operably connected to the pointer to effect rotation thereof with reference to the dial according to the pressure delivered to the tube. The front of the case is closed by a transparent crystal and the back is generally a solid metal wall integral with the walls of the case. Sometimes by reason of defective tubing or by reason of excessive pressure or both, the Bourdon tube may burst within the instrument admitting the high pressure fluid to the instrument case with the result that the crystal is blown out of the front of the instrument together with fragments of the tube, pointer, dial and operating mechanism. To avoid this risk of blow-out at the front with the attendant dangers of flying fragments, instruments have been constructed so that the back wall blows out rather than the front wall or crystal. One way has been to omit the rigid back wall and to substitute therefor a sheet of paper, the latter being cemented to the open back of the case to seal it against ingress of dust and moisture. Another way has been to attach a very thin plate of metal to the back by a screw so that when the blow-out occurs the plate will immediately bend outwardly away from the back allowing the pressure to escape. Still another way was to perforate the rigid back and then to attach a very thin metal plate. Such expedients have not been satisfactory from the point of view of manufacture, maintenance and safety and consequently the present invention has for its principal objects to provide an improved blow-out back for a pressure gauge which will insure positive release of the excess pressure at a sufficiently rapid rate so that there is no danger of fracture of the front crystal, which will insure control of the escaping fluid and fragments so that the least danger will be incurred from flying fragments, which will provide a maximum amount of protection from ingress of dust and moisture, which will not adhere to the case by prolonged pressure contact therewith, or be sealed thereto by paint or other coatings applied thereto, which will be easily removable to permit inspection and repair of the operating mechanism within the case and which will be of simple inexpensive construction minimizing changes in the conventional instruments.

In accordance with the foregoing objects, the instrument has a displaceable back wall in the form of a cover plate which is yieldably held in contact with the back of the case so that its rearward movement in response to excessive pressure within the case is controlled and in turn controls the escape of high pressure fluid and fragments propelled thereby without destruction of the cover itself. Control is attained by constraining the movement of the cover in a direction perpendicular to its plane so that as it moves rearwardly an annular opening is afforded peripherally of the back through which the escaping fluid pressure and fragments are deflected laterally, the change in direction of the escaping material thus effected, dissipating the energy of the fluid and flying fragments so as to substantially reduce the distance of projection and confining the projection to a direction radially of the center of the instrument so that most of the fragments fly upwardly, sidewise and downwardly rather than forwardly and rearwardly. As soon as the pressure is dissipated the back will return to its normal position under the spring pressure. The yieldable control of the rearward movement of the cover is afforded by a bracket to which the cover is attached, the bracket being mounted within the case for movement perpendicular to the plane of the back on a pair of spaced, parallel posts and in the absence of excessive pressure within the case being normally held retracted by springs within the case so that the cover is held tightly against the back of the case. Cooperable threaded elements of the bracket and cover serve removably to attach the cover to the bracket. A rubber or composition gasket is ordinarily used between the case and cover and in order to prevent sticking of the cover to the gasket or the accumulation of paint on the cover which might seal it to the case the cover is coated with a substance which has substantially no affinity for rubber or the like material or for paint.

The invention will now be described in greater detail with reference to the accompanying drawings wherein.

Figure 3:
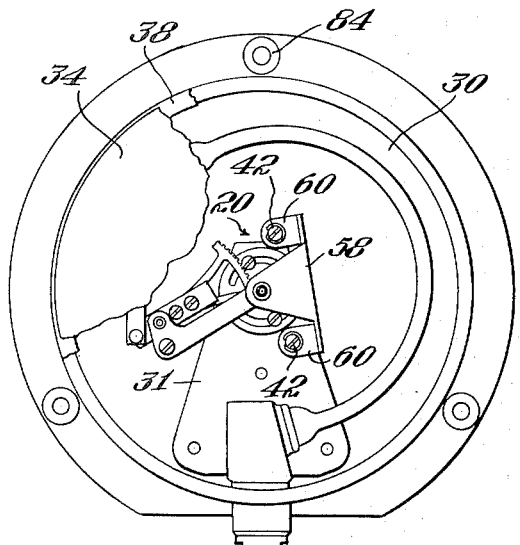
Fig. 3 is a rear view of the gauge with the blow-out disc assembly broken away in part to show the spring bracket assembly contained in the case.
Figure 1:
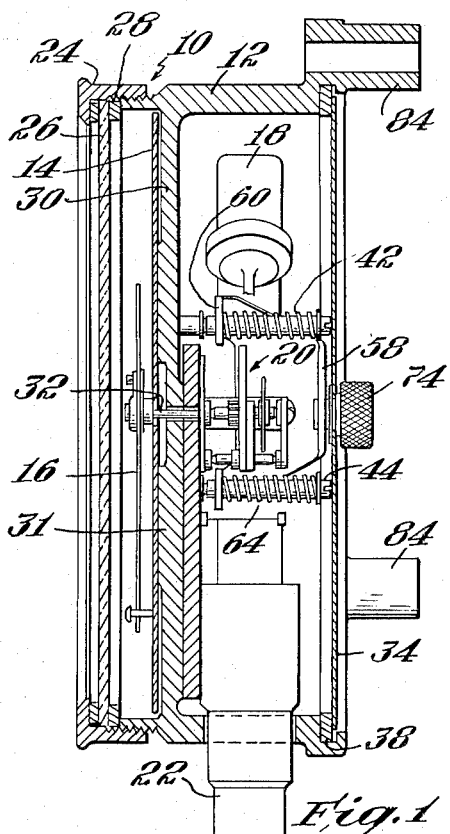
Fig. 1 is a diametrical section through the gauge case showing the spring bracket assembly and blow-out disc assembly.

Referring to the drawings, the pressure gauge 10 comprises a case 12 within which there is located a dial 14, a pointer 16 movable relative to the dial, and a Bourdon tube and mechanism 20 operable thereby to rotate the pointer. A stem 22 set into the wall of the case connects the Bourdon tube to the source of pressure which is to be measured.

The instrument case 12 has a cylindrical wall and is open at the front and back. The external surface of the front opening is threaded to receive a conventional bezel 24 for retaining a crystal 26 over the face of the instrument, a suitable retaining ring 28 being interposed between the crystal and the rim of the case. The interior of the case is divided between the front and back openings by a diametrically extending rigid wall 30, on the forward face of which is mounted the dial 14. The pointer 16 is made fast to a shaft 32 which extends through a hole in the wall 30 from its forward or front face into the back part of the case where it is connected by the mechanism 20 which need not be described herein, to the Bourdon tube 18, also located at the back side of the wall 30.

Figure 2:
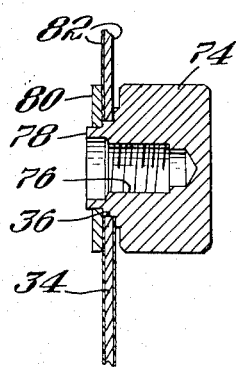
Fig. 2 shows the component parts of the blow-out disc assembly.

The closure for the open back of the casing, Fig. 2, is a rigid circular plate 34 having a central opening 36 therein for receiving an attaching knob to be described hereinafter. The rim of the plate is adapted to have contact with a gasket 38 which is set into an annular groove extending circumferentially of the back opening, the outer perimeter of the groove being reentrant so as to retain the gasket and the inner perimeter being open so that the rim of the plate clears the wall of the groove.

Figures 4, 5:
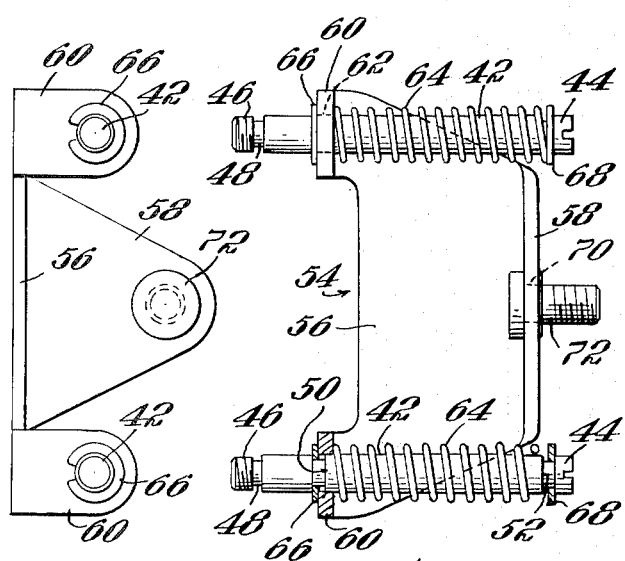
Fig. 4 is a bottom view of the spring bracket assembly.
Fig. 5 is a front view of the spring bracket assembly.

The gasket may be of rubber or a composition thereof, felt, or any other suitable material. The cover plate is held in contact with the gasket so as to be yieldably displaceable rearwardly in the event that pressure within the casing becomes excessive, for example by breaking of the Bourdon tube, in a controlled manner, that is so as to control the direction in which the fluid pressure is released and the direction in which fragments of the mechanism will be ejected and without destruction of the cover plate itself so that it will return to its normal position as soon as the pressure subsides. To this end a pair of studs 42 having heads 44 at one end and threaded nubs 46 at their opposite ends are staked to the rear side of the wall 30 by screwing them into threaded holes in the wall or to a plate 31 screwed to the wall. As shown in Fig. 3, the studs 42 are located so as to straddle the operating mechanism 20 and are radially equidistant from the center of the case. Each stud is provided with an annular shoulder 48 at the base of its threaded nub which limits the entrance of its threaded end into the threaded opening of the wall 30 and provides for stability after the stud is screwed up hard against the back. Each stud is also provided with a pair of spaced annular grooves 50 and 52. The studs extend rearwardly from the wall 30 parallel to the central axis of the instrument and their heads 44 terminate short of the rim of the back opening and have slots therein for reception of a screw driver so as to facilitate inserting and removing the studs. A movable U-shaped bracket or carriage 54 is mounted on the studs and provides a movable connection between the case and the cover. The bracket has a flat web 56, from one side and opposite ends of which project at right angles, spaced parallel flanges 58 and 60—60. The flanges 60—60 are spaced, being located near opposite edges of the plate and have holes 62 therein of such size as slidably to engage the studs 42. The bracket is mounted on the studs (Figs. 5) with the flanges 60—60 seated against collars 66 placed in the grooves 50 and with the flange 58 located outwardly thereof. A pair of coiled springs 64 are then mounted on the studs so as to bear at their inner ends against the flanges 60—60. The outer ends of the springs are retained in place by collars 68 placed in the grooves 52 adjacent the heads of the studs. As thus constructed the bracket 54 is yieldably held in a retracted position in contact with the collars 66 but may be displaced outwardly along the studs by yielding of the springs 64 in compression. The flange 58 projects forwardly of the wall 56 so that its forward portion overlies the center of the instrument and has a hole 70 therein which is concentric with the center of the instrument. A threaded stud 72 is staked in the hole 70 so that its threaded end projects outwardly therefrom through the opening 36 in the cover plate 34. A knob 74 is rotatably fastened to the cover and has an internally threaded opening 76 for engagement with the threaded stud 72. The knob has an annular neck 78 which projects through the opening 36 in the cover plate and has fast to it at the inner side of the cover plate a retaining washer 80 which prevents removal of the knob from the cover and yet permits rotation relative to the cover. By rotating the knob 74 so as to interengage the threaded portions of the stud 72 and nut, the stud is drawn into the head of the knob thereby drawing the bracket 54 outwardly against the springs 64 and drawing the cover plate inwardly against the gasket 38. Thus the cover is held against the gasket under the spring pressure of the springs 64 which provides a tight seal circumferentially of the cover and yet permits the cover to move rearwardly in the event of excessive pressure within the case by compression of the springs. Rearward movement of the plate is limited to approximately ½″, that is the springs will yield sufficiently to permit the bracket to travel rearwardly, approximately ½″. Rearward movement takes place perpendicular to the plane of the cover by reason of the guiding effect produced by the spaced, parallel studs so that as the cover moves rearwardly a uniform annular gap is opened peripherally of the instrument through which the pressure may escape laterally entirely around the perimeter of the back. The cover in effect acts as a baffle and being rigid deflects the fluid and fragments causing them to change direction. This in large measure dissipates the energy of the escaping fluid and the flying fragments and at the same time limits the direction of escape to a plane which is parallel to the back of the instrument so that for the most part the escaping fragments will fly upwardly or downwardly and sidewise rather than forwardly or rearwardly.

As constructed it is clear that the back panel or cover may easily be removed for inspection or repair of the instrument by a simple operation of rotating the knob 74 to disengage it from the stud 72 and that since the spring bracket assembly is located astride and to one side of the operating mechanism the latter can be reached without removing the assembly although if major repairs must be made the entire assembly may readily be removed by detaching the studs 42 from the wall 30.

As herein illustrated the studs are staked to the wall 30, however, their lateral spacing could be increased and in fact they might be threaded into bosses formed on the inside wall of the casing.

It is well known that gasket material especially rubber gaskets tend to adhere to a surface held in contact therewith for any considerable length of time where pressure is employed. Such adhesion may become strong enough to nullify the blow-out construction afforded by the spring bracket assembly. Accordingly, at least that portion of the cover plate 34 which is to have contact with the rubber gasket is coated with a plastic material 82 which has no affinity for rubber or other gasket material and will not adhere thereto even though held in close contact with the gasket for prolonged periods under pressure. The coating material is a plastic such as polytetrafluoroethylene (trade name Teflon)), polytrifluorochloroethylene (trade name Kel-F) and like plastics, which may easily be applied to the plate. Preferably, the entire plate is coated with the plastic. Employing such a coating has an added advantage in that it has no affinity for paint and hence if paint is applied to the instrument it will not seal the cover plate in place so as to render it inoperable when blow-out occurs.

The casing has the usual attaching lugs 84, there being three circumferentially spaced about the back part thereof for supporting it in place where it is to be used.

It should be understood that the present disclosure is for the purpose of illustration only and that this invention includes all modifications and equivalents which fall within the scope of the appended claims.

I claim:

1. In a pressure gauge, a case having a rearwardly facing opening, a cover for said opening, a pair of headed studs fast at their inner ends to the case, a bracket mounted on the studs, said bracket being movable along the studs from a position near the inner ends of the studs outwardly toward their heads, a coil spring on each stud placed between the bracket and the head of the stud, said springs opposing outward movement of the bracket, a threaded element fast to the bracket, a cooperable threaded element engageable with the first threaded element through a hole in the cover, a portion of said second threaded element bearing on the cover and being rotatable to draw the cover into contact with the casing and to compress the springs.

2. In a pressure gauge, a case having a rearwardly facing opening, a cover for said opening, a pair of headed studs screwed to the case so that the heads project rearwardly, a bracket having spaced pierced bosses slidably engaged with the studs and movable thereon toward their heads, compression springs mounted on the studs between the bosses and the heads normally holding the bracket retracted within the case, a threaded element fast to the bracket located at the center of the back, and a second threaded element cooperable with the first threaded element, said second element having a part engageable with the cover to draw the latter against the case as the mating threaded elements are rotated to engage the threaded parts and to move the bracket in a direction to compress the springs.

3. In a pressure gauge, a case having a dial and operating mechanism therefor, located in independent compartments separated by a wall situated between the front and back of the case, a gauge glass covering the front of the case, a closure plate covering the back of the case, a pair of spaced headed studs screwed into the wall so as to project rearwardly therefrom, a bracket plate having bosses slidably engaged with the studs and movable thereon toward the heads of the studs, compression springs on the studs located between the bosses and heads normally holding the bracket retracted within the case, a threaded element fast to the bracket, and a cooperable threaded element engageable with the first threaded element through a hole in the cover, rotation of said element being operable to draw the cover into contact with the case and to draw the bracket rearwardly on the studs to compress the springs.

References Cited in the file of this patent

UNITED STATES PATENTS

| | | |
|---|---|---|
| 1,461,200 | Strandell | July 10, 1923 |
| 2,215,013 | Mickelberg | Sept. 17, 1940 |
| 2,335,063 | Hopkins | Nov. 23, 1943 |
| 2,580,546 | Hobson | Jan. 1, 1952 |

FOREIGN PATENTS

| | | |
|---|---|---|
| 449,827 | Great Britain | July 6, 1936 |

OTHER REFERENCES

Product Engineering, September 1952, p. 153.